(12) United States Patent
Suwabe et al.

(10) Patent No.: US 7,740,809 B2
(45) Date of Patent: Jun. 22, 2010

(54) EXHAUST GAS-CLEANING APPARATUS

(75) Inventors: Hirohisa Suwabe, Tochigi-ken (JP); Hiroshi Funabashi, Tokyo (JP)

(73) Assignees: Hitachi Metals, Ltd., Tokyo (JP); Hino Motors Ltd., Tokyo (JP)

( * ) Notice: Subject to any disclaimer, the term of this patent is extended or adjusted under 35 U.S.C. 154(b) by 612 days.

(21) Appl. No.: 11/353,961

(22) Filed: Feb. 15, 2006

(65) Prior Publication Data

US 2007/0189936 A1 Aug. 16, 2007

(51) Int. Cl.
*B01D 50/00* (2006.01)
(52) U.S. Cl. .................................................. 422/180
(58) Field of Classification Search ................. 422/168, 422/177, 180, 182; 60/286
See application file for complete search history.

(56) References Cited

U.S. PATENT DOCUMENTS

| | | | | |
|---|---|---|---|---|
| 4,519,820 A | * | 5/1985 | Oyobe et al. | 55/284 |
| 4,912,776 A | * | 3/1990 | Alcorn | 423/239.1 |
| 7,204,965 B2 | * | 4/2007 | Okawara et al. | 422/177 |
| 2003/0213234 A1 | * | 11/2003 | Funk et al. | 60/286 |
| 2004/0047774 A1 | * | 3/2004 | Suwabe et al. | 422/177 |

FOREIGN PATENT DOCUMENTS

| | | |
|---|---|---|
| JP | 2000-303826 | 10/2000 |
| JP | 2002-502927 A | 1/2002 |
| JP | 2005-06861 | 10/2005 |
| WO | WO 99/39809 | 8/1999 |

* cited by examiner

*Primary Examiner*—Tom Duong
(74) *Attorney, Agent, or Firm*—Sughrue Mion, PLLC

(57) ABSTRACT

An apparatus for cleaning an exhaust gas containing nitrogen oxide and particulate matter and discharged from a diesel engine, wherein the apparatus comprises a porous ceramic honeycomb filter and an SCR catalytic converter in this order from upstream, wherein the honeycomb filter has pluralities of flow paths partitioned by porous cell walls and a catalyst supported by the porous cell walls, with desired flow paths sealed by plugs, and wherein at least one plug on the side of an exhaust gas inlet is separate inward from an exhaust gas inlet end. A ratio D/V of the diameter D (mm) of the honeycomb filter to the displacement V (liter) of the diesel engine is preferably 15 mm/liter or more. The honeycomb filter and an SCR catalytic converter are preferably contained in one case.

9 Claims, 5 Drawing Sheets

EXHAUST GAS-CLEANING APPARATUS

FIELD OF THE INVENTION

The present invention relates to an apparatus for cleaning an exhaust gas discharged from a diesel engine and containing nitrogen oxide (NOx) and particulate matter.

BACKGROUND OF THE INVENTION

Demand is mounting for diesel engines mainly in Europe because of their high fuel efficiency. Because particulate matter (hereinafter referred to simply as "PM") and NOx contained in exhaust gases discharged from diesel engines largely affect human health, various investigations have been conducted to reduce the amounts of PM and NOx. As an exhaust gas-cleaning apparatus for reducing the amounts of PM and NOx in an exhaust gas, JP2000-303826 discloses, as shown in FIG. 4, an exhaust gas-cleaning apparatus comprising an oxidation catalyst 3, a filter 4 and a selective catalytic reduction (SCR) catalyst 5 in this order from upstream in an exhaust gas path 2 connected to a diesel engine 1, a valve 6a communicating with a reducing agent reservoir 6b being provided between the filter 4 and the SCR catalyst 5.

JP2002-502927A discloses an improved SCR system for treating a combustion exhaust gas containing NO and PM, which comprises a particulate matter trap (filter) comprising a catalyst for effectively oxidizing at least part of NO in NOx to $NO_2$ and burning at least part of PM at relatively low temperatures in the presence of $NO_2$, a reservoir of a nitrogen compound (ammonia or urea) as a reducing agent, and an SCR catalytic converter for converting NOx to $N_2$ by flowing a mixture of an $NO_2$-rich exhaust gas and the nitrogen compound as a reducing agent there through, in this order. The SCR is to selectively reduce NOx to $N_2$ by causing a high-temperature exhaust gas to pass through a catalyst in the presence of a nitrogen compound (ammonia or urea) as a reducing agent.

JP2002-502927A describes that an oxidation catalyst supported by the filter disposed upstream of the SCR catalytic converter is effective to increase the conversion ratio of NOx to $N_2$ in the SCR catalytic converter, that the oxidation catalyst is preferably a platinum catalyst supported by a ceramic or metal through-flow honeycomb, that the filter is preferably a ceramic wall-flow filter, and that the SCR catalyst is preferably a catalyst of $V_2O_5/WO_3/TiO_2$ supported by a through-flow honeycomb.

JP2005-296861A discloses a filter for cleaning an exhaust gas from a diesel engine, which comprises porous cell walls partitioning flow paths and carrying an oxidation catalyst, an exhaust gas flowing into inlet-side flow paths entering into adjacent flow paths opening at the outlet side via the porous cell walls and being discharged therefrom, and the amount of a catalytically active component per a unit area of the porous cell walls being larger on the outlet side than on the inlet side. An SCR catalytic converter is disposed downstream of this filter. JP2005-296861A describes that with the SCR catalytic converter disposed downstream of a filter carrying an oxidation catalyst, and with the amount of the oxidation catalyst carried by the porous cell walls larger on the outlet side than on the inlet side, NOx can be efficiently removed even when the exhaust gas is at a low temperature. It further proposes that a catalyst and a heater are disposed upstream of the filter as means for burning PM at lower temperatures.

However, the temperature of an exhaust gas largely differs between when the diesel engine is fully operated and when it is idling. In a case where start and stop are repeated, a low-temperature exhaust gas is sometimes discharged. When the temperature of the exhaust gas becomes lower, the temperature of an SCR catalytic converter downstream of a filter is lowered, resulting in decrease in the conversion ratio of NOx to $N_2$.

JP2002-250220 discloses an exhaust gas-cleaning apparatus for diesel engines comprising a particulate filter and a NOx catalyst in one casing, a urea-spraying nozzle being open on an inner wall of the casing between the particulate filter and the NOx catalyst. However, because there is inevitably a small gap between the particulate filter and the NOx catalyst for the purpose of making the exhaust gas-cleaning apparatus smaller, it has been found that the urea-spraying nozzle open on the inner wall of the casing fails to have urea uniformly mixed with an exhaust gas discharged from the particulate filter.

OBJECT OF THE INVENTION

Accordingly, an object of the present invention is to provide an exhaust gas-cleaning apparatus with suppressed temperature decrease even when an exhaust gas discharged from an engine is at a low temperature, thereby avoiding decrease in the performance of an SCR catalytic converter and the conversion ratio of NOx to $N_2$.

DISCLOSURE OF THE INVENTION

The apparatus for cleaning an exhaust gas containing nitrogen oxide and particulate matter and discharged from a diesel engine according to the present invention comprises a porous ceramic honeycomb filter and an SCR catalytic converter in this order from upstream, the honeycomb filter having pluralities of flow paths partitioned by porous cell walls and a catalyst supported by the porous cell walls, with desired flow paths sealed by plugs, and at least one plug on the side of an exhaust gas inlet being separate inward from an exhaust gas inlet end.

The exhaust gas-cleaning apparatus of the present invention preferably comprises an ammonia slip catalyst downstream of the SCR catalytic converter.

The catalyst supported by the honeycomb filter preferably comprises a platinum-group metal.

The catalyst supported by porous cell walls on the exhaust gas inlet side of the honeycomb filter is preferably higher in activity than a catalyst supported by porous cell walls on the exhaust gas outlet side.

A ratio D/V of the diameter D (mm) of the honeycomb filter to the displacement V (liter) of the diesel engine is preferably 15 mm/liter or more.

The honeycomb filter and the SCR catalytic converter are preferably contained in one case. A nozzle for injecting a reducing agent is preferably disposed in the case between the honeycomb filter and the SCR catalytic converter.

The case preferably comprises a first case part for accommodating the honeycomb filter, a second case part for accommodating the SCR catalytic converter, and an annular member gas-tightly fixed to both case parts, the nozzle being fixed to the annular member.

DESCRIPTION OF THE PREFERRED EMBODIMENTS

[1] Porous Ceramic Honeycomb Filter (1) Structure of Honeycomb Filter

Figure 2:
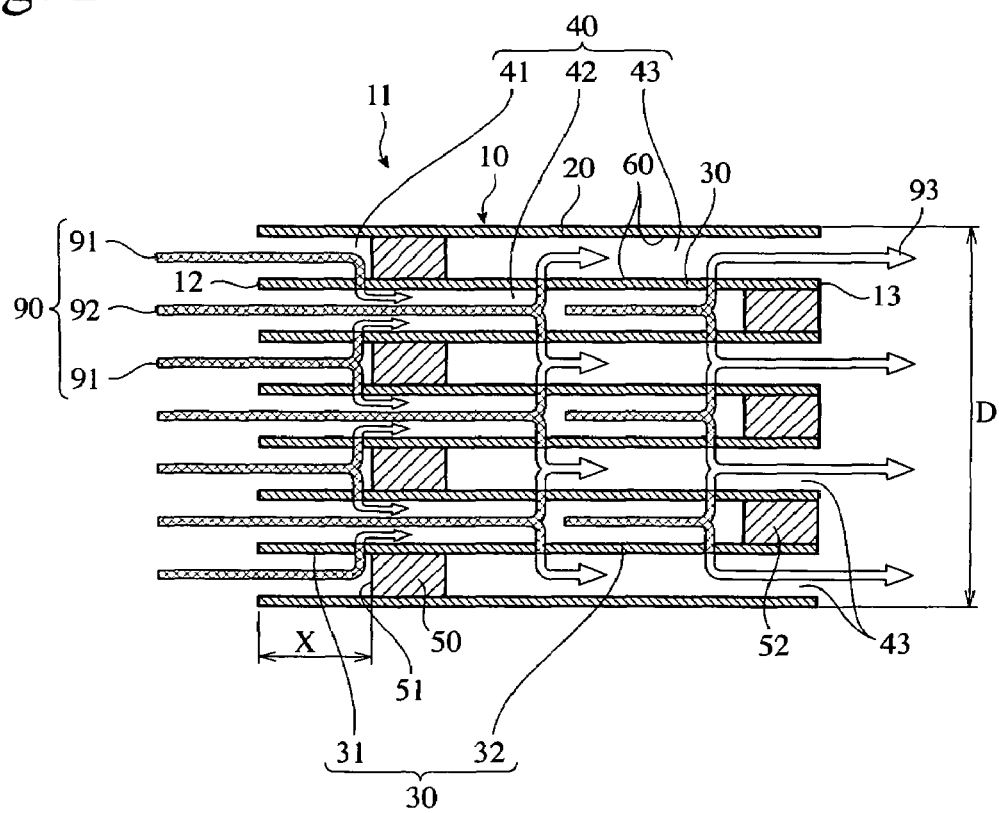
FIG. 2 is a schematic cross-sectional view showing a porous ceramic honeycomb filter preferable in the present invention.

FIG. 2 shows one example of porous ceramic honeycomb filters 11 constituting the exhaust gas-cleaning apparatus of the present invention. The honeycomb filter 11 comprises a porous ceramic honeycomb structure 10 comprising a peripheral wall 20 having a substantially circular or elliptical cross section perpendicular to flow paths, and porous cell walls 30 inside the peripheral wall 20 for defining large numbers of flow paths 40, and plugs 50, 52 alternately disposed at desired positions in the flow paths 40 of the honeycomb structure 10. An end surface 51 of at least one plug 50 on the exhaust gas inlet side is disposed inside the inlet end 12 of the honeycomb filter 11. A catalyst is supported by the porous cell walls 30. Because of the inlet-side plugs 50 and the outlet-side plugs 52 both disposed alternately, the porous cell walls 30 are divided to porous cell wall portions 31 upstream of the inlet-side plugs 50 and porous cell wall portions 32 downstream of the inlet-side plugs 50, and the flow paths 40 are divided to flow path portions 41 upstream of the inlet-side plugs 50, flow path portions 42 having the outlet-side plugs 52, and flow path portions 43 downstream of the inlet-side plugs 50.

In the honeycomb filter having such structure, an exhaust gas flows into the flow path portions 41, 42 through the inlet end 12. Among exhaust gas streams 90, an exhaust gas stream 91 flowing into the flow path portions 41 flow into the adjacent flow path portions 42 via pores of the porous cell wall portions 31 because of the inlet-side plugs 50, converge with an exhaust gas stream 92 flowing into the flow path portions 42 from the inlet end 12, and flow into the adjacent flow path portions 43 via pores of the porous cell wall portions 32 because of the outlet-side plugs 52, and are discharged from the outlet end 13 as shown by the arrow 93. In this course, PM in the exhaust gas is captured by the porous cell walls 30 while flowing through the flow path portions 41-43 and the porous cell walls 30. The captured PM is burned by an oxidation reaction with a fuel added to the exhaust gas from a fuel-adding means described later in the presence of a catalyst.

Figure 5:
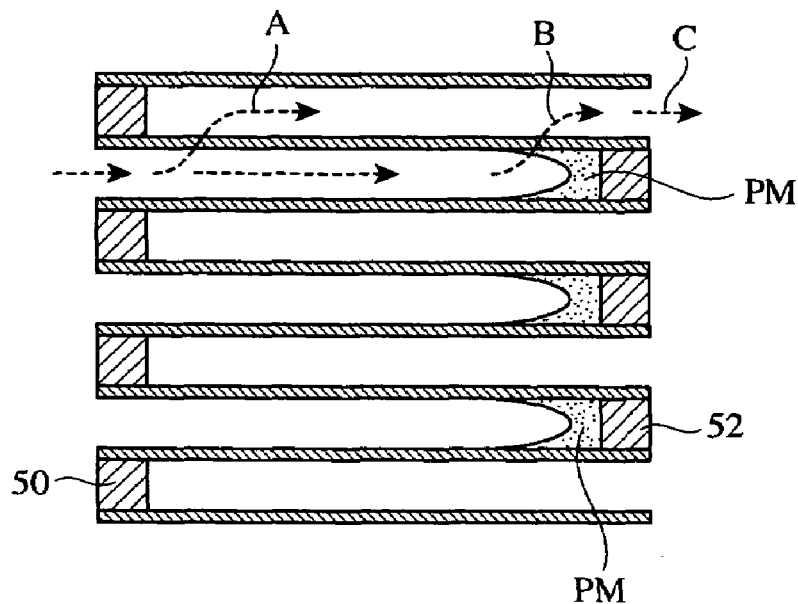
FIG. 5 is a schematic view showing PM accumulated in the conventional porous ceramic honeycomb filter.
Figure 6:
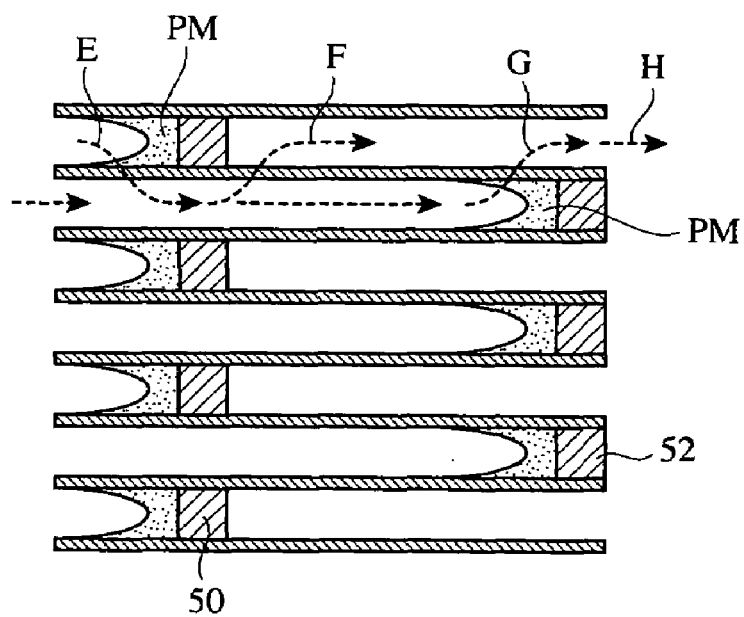
FIG. 6 is a schematic view showing PM accumulated in a porous ceramic honeycomb filter constituting the exhaust gas-cleaning apparatus of the present invention.

In the conventional honeycomb filter having inlet-side plugs 50 disposed at the inlet end 12 as shown in FIG. 5, PM is most accumulated near the outlet-side plugs 52, with the amount of PM accumulated decreasing as going upstream. Accordingly, heat generated by the burning of PM is less likely to be transmitted to the upstream side of the honeycomb filter. On the other hand, in the honeycomb filter 11 constituting the exhaust gas-cleaning apparatus of the present invention, a lot of PM is accumulated not only near the outlet-side plugs 52 but also upstream of the inlet-side plugs 50 as shown in FIG. 6, because of the inlet-side plugs 50 disposed inside the inlet end 12. Accordingly, once the burning of PM starts, the entire honeycomb filter is quickly heated.

When the engine is put in an idling state, rapidly lowering the temperature of the exhaust gas, the conventional honeycomb filter shown in FIG. 5 is rapidly cooled on the upstream side by a low-temperature exhaust gas, despite that the burning of PM provides heat to the downstream side. Accordingly, though an exhaust gas (shown by the arrow B) flowing through porous cell walls on the downstream side is heated by the burning of PM, mixing with a low-temperature exhaust gas (shown by the arrow A) flowing through porous cell walls on the upstream side lowers the temperature of an exhaust gas discharged from the honeycomb filter (shown by the arrow C). As a result, the temperature of the SCR catalytic converter lowers, resulting in decrease in the conversion ratio of NOx to $N_2$ in the SCR catalytic converter. On the other hand, in the honeycomb filter shown in FIG. 6, all exhaust gas streams E, F, G are heated by the burning of PM even on the upstream sides. Accordingly, a high-temperature exhaust gas stream H flows into the SCR catalytic converter, so that the temperature of the SCR catalytic converter is prevented from lowering even though the temperature of an exhaust gas discharged from an engine lowers. As a result, decrease in the conversion ratio of NOx to $N_2$ in the SCR catalytic converter can be prevented.

An exhaust gas can flow at a low speed in the flow path portions 41, 42, when a ratio D/V of the diameter D (mm) of the honeycomb filter 11 to the displacement V (liter) of a diesel engine 1 is 15 mm/liter or more. This prevents a low-temperature exhaust gas from flowing in the flow path portions 41, 42 at a high speed when an engine is put in an idling state during the burning of PM, thereby preventing the burning of PM from stopping and thus keeping the honeycomb filter 11 at a high temperature. Though there is no particular upper limit in the ratio D/V, a honeycomb filter having such a large diameter as exceeding 80 mm/liter is not only disadvantageous in production cost, but also has difficulty in finding enough space for installation in a vehicle. The more preferred ratio D/V is 20-60 mm/liter.

As shown in FIG. 2, the distance X between an inlet end surface 51 of the inlet-side plugs 50 and the inlet end 12 is preferably 40 mm or more. With the honeycomb filter 11 having a large diameter D, and the inlet-side plugs 50 disposed inside the inlet end 12 by the distance X of 40 mm or more, PM can be accumulated upstream of the inlet-side plugs 50 in such an amount as to secure burning for a certain period of time, even when an exhaust gas discharged from an engine has a reduced temperature. From the aspect of pressure loss, the distance X is preferably as small as possible, though the distance X should be large enough to secure a high temperature in the exhaust gas discharged from the honeycomb filter 11. Accordingly, the distance X is preferably 0.5 times or less of the length of the honeycomb filter, more preferably 0.2-0.45 times. At least 70% of the inlet-side plugs 50 are preferably positioned inside the inlet end 12 by the distance X of 40 mm or more.

The porous cell walls 30 of the honeycomb filter 11 preferably have porosity of 50-80% and an average pore diameter of 10-40 μm. When the porous cell walls 30 have porosity of less than 50% or an average pore diameter of less than 10 μm, the porous cell walls 30 have large permeation resistance, resulting in providing the honeycomb filter with large pressure loss. When the porosity exceeds 80%, or when the average pore diameter exceeds 40 μm, the honeycomb filter 11 has such small strength that it may be broken by mechanical stress and vibration during driving. The honeycomb filter 11 preferably has porosity of 60-75% and an average pore diameter of 15-25 μm.

The porous cell walls 30 preferably have thickness of 0.1-0.5 mm and a pitch of 1.2 mm or more. When the thickness of the porous cell walls 30 is less than 0.1 mm, the honeycomb filter 11 has too small strength. When the thickness of the porous cell walls 30 exceeds 0.5 mm, the porous cell walls 30 have too large gas permeation resistance, providing the honeycomb filter 11 with large pressure loss. The more preferred thickness of the porous cell walls 30 is 0.2-0.4 mm. When the pitch of the porous cell walls 30 is less than 1.2 mm, the honeycomb filter 11 has a small opening area, resulting in large pressure loss.

Materials for the honeycomb filter 11 are preferably ceramic materials with excellent heat resistance, such as cordierite, alumina, mullite, silicon nitride, silicon carbide, LAS, etc., or ceramic materials based thereon. Among them, a cordierite honeycomb structure is most preferable, because it is inexpensive and has excellent heat resistance and corrosion resistance and low thermal expansion.

(2) Catalyst

The catalyst supported by the honeycomb filter 11 preferably comprises a platinum-group metal. The catalyst containing a platinum-group metal accelerates the burning of PM, thereby elevating the temperature of the exhaust gas and thus the temperature of an exhaust gas discharged from the honeycomb filter 11. The temperature of the SCR catalytic converter 5 is thus elevated, resulting in an improved conversion ratio of NOx to $N_2$.

The platinum-group metal may be, for instance, at least one selected from the group consisting of Pt, Pd, Ru and Rh in the form of a simple substance or an oxide. The catalyst may contain an alkaline earth metal oxide or a rare earth metal oxide. When the catalyst containing a platinum-group metal is supported by a high-specific-surface-area carrier (active alumina such as γ-alumina), there is preferably a large contact area between a catalytically active component and an exhaust gas.

A catalyst supported by the porous cell wall portions 31 on the exhaust gas inlet side of the honeycomb filter 11 preferably has higher activity than that of a catalyst supported by the porous cell wall portions 32 on the exhaust gas outlet side. With this condition met, the catalyst supported by the porous cell wall portions 31 causes an oxidation reaction of a fuel added to the exhaust gas by the fuel-adding means described later on the upstream side, thereby accelerating the burning of PM and thus elevating the temperature of the exhaust gas. Thus elevated are the temperature of an exhaust gas discharged from the honeycomb filter 11 and the temperature of the SCR catalytic converter 5.

To provide the catalyst on the exhaust gas inlet side with higher activity than that of the catalyst on the exhaust gas outlet side, the amount of an oxidation catalyst (platinum-group metal such as Pt, Pd, Ru, Rh, etc.) should be larger on the exhaust gas inlet side than on the exhaust gas outlet side. The amount of a co-catalyst composed of a base metal oxide such as an alkaline earth metal oxide and a rare earth metal oxide may not be less on the exhaust gas inlet side than on the exhaust gas outlet side. For instance, with a platinum-group metal and an oxide of a rare earth metal such as lanthanum, cerium, etc. supported more on the porous cell walls 31 than on the porous cell wall portions 32, the efficiency of burning PM is improved, thereby suppressing the temperature of the honeycomb filter 11 from lowering even when the temperature of an exhaust gas discharged from an engine lowers.

To change the amounts of the oxidation catalyst and the co-catalyst between the upstream side and the downstream side, for instance, (1) a method of immersing the entire honeycomb filter in a solution containing both oxidation catalyst and co-catalyst, and then immersing only the upstream side in the same catalyst solution, (2) a method of immersing the entire honeycomb filter in a solution containing both oxidation catalyst and co-catalyst, and then immersing only the upstream side in an oxidation catalyst solution, (3) a method of immersing only the downstream side of the honeycomb filter in a solution containing both oxidation catalyst and co-catalyst, and then immersing only the upstream side in another solution containing both oxidation catalyst and co-catalyst with the amount of the oxidation catalyst increased, etc. may be carried out.

As described above, the conversion rate of NOx to $N_2$ in the SCR catalytic converter is prevented from lowering by keeping an exhaust gas discharged from the honeycomb filter at a high temperature in the present invention, and it may be presumed that in the cases of JP2002-502927A and JP2005-296861A, too, the temperature of an exhaust gas discharged from the honeycomb filter can be elevated by burning PM after accumulated in a large amount in the honeycomb filter. However, it has been found difficult in practice for reasons below.

The first reason is that in the cases of JP2002-502927A and JP2005-296861A, the honeycomb filter should have a large volume to capture a large amount of PM, so that (a) the honeycomb filter has a large heat capacity, needing much time until the honeycomb filter is sufficiently heated after the engine starts, during which a low-temperature exhaust gas flows into the SCR catalytic converter, resulting in decrease in the conversion ratio of NOx to $N_2$ in the SCR catalytic converter, and that (b) the exhaust gas-cleaning apparatus also has a large volume as a whole, resulting in difficulty in finding enough space for installation on a vehicle. On the other hand, the exhaust gas-cleaning apparatus of the present invention can be made smaller than the exhaust gas-cleaning apparatus described in JP2002-502927A, in which an oxidation catalyst is disposed upstream of the honeycomb filter, and need not be made larger unlike the honeycomb filter described in JP2005-296861A.

The second reason is that while an exhaust gas discharged from the honeycomb filter reaches a temperature of 800° C. or higher once PM captured in a large amount starts burning, resulting in the deterioration of the SCR catalyst in the cases of JP2002-502927A and JP2005-296861A, the honeycomb filter used in the present invention captures PM on both upstream and downstream sides, making it unlikely that the burning temperature of PM is extremely elevated, thereby preventing the SCR catalyst from being deteriorated.

The present invention is thus advantageous in that (a) even when the temperature of an exhaust gas discharged from an engine lowers, the temperature of the SCR catalytic converter is prevented from lowering, thereby avoiding decrease in the conversion ratio of NOx to $N_2$ in the SCR catalytic converter, that (b) the exhaust gas-cleaning apparatus can be made small, and that (c) the deterioration of the SCR catalyst by exposure to a high-temperature exhaust gas can be prevented.

[2] SCR Catalytic Converter

The SCR catalytic converter 5 preferably comprises a ceramic honeycomb structure having large numbers of flow paths partitioned by porous cell walls inside a peripheral wall, and an SCR catalyst supported by the porous cell walls. To reduce the amount of NOx in an exhaust gas discharged from the honeycomb filter 11 efficiently in the SCR catalytic converter 5, the ceramic honeycomb structure for the SCR catalytic converter 5 preferably has as large a geometric surface area as possible. Accordingly, the porous cell walls of the ceramic honeycomb structure preferably have thickness of 0.05-0.25 mm and a pitch of 0.8-1.6 mm. When the thickness of the porous cell walls is less than 0.05 mm, the honeycomb structure has insufficient strength. When it exceeds 0.25 mm, the honeycomb structure has too large permeation resistance, resulting in large pressure loss. The more preferred thickness of the porous cell walls is 0.08-0.15 mm. When the pitch of the porous cell walls is less than 0.8 mm, the ceramic honeycomb structure has too small opening area, resulting in large pressure loss. When the pitch of the porous cell walls exceeds 1.6 mm, the honeycomb structure has too small a geometric surface area, resulting in decrease in the clearing performance of the SCR catalytic converter 5. The more preferred pitch of the porous cell walls is 0.9-1.3 mm.

The porous cell walls of the ceramic honeycomb structure for the SCR catalytic converter 5 preferably have porosity of 25-45% and an average pore diameter of 1-10 µm. When the porous cell walls have porosity of less than 25% or an average pore diameter of less than 1 µm, the SCR catalyst is not easily supported, resulting in decrease in cleaning performance. On the other hand, when the porous cell walls have porosity of more than 45% or an average pore diameter of more than 10 µm, the ceramic honeycomb structure has such low strength that it is likely to be damaged by mechanical stress and vibration.

The ceramic honeycomb structure for the SCR catalytic converter 5 may be formed by the same ceramic material as for the honeycomb filter 11. The SCR catalyst is preferably $V_2O_5$, $WO_3$ and $TiO_2$, and may further contain Pt, $Fe_2O_3$, CuO, $Mn_2O_3$, $Cr_2O_3$, $MoO_3$, etc.

[3] Fuel-Adding Means

A means for adding a fuel to an exhaust gas may be disposed upstream of the honeycomb filter 11. Even when an exhaust gas discharged from an engine is at a low temperature, the addition of a fuel to an exhaust gas elevates the temperature of the honeycomb filter 11 by the oxidation function of an oxidation catalyst supported by the porous cell walls 30 of the honeycomb filter 11, thereby increasing the conversion ratio of NO to $NO_2$ and thus accelerating the burning of PM.

[4] Reducing Agent-Supplying Apparatus

A reducing agent-supplying apparatus 6 comprising a reducing agent reservoir 6b and a valve 6a for injecting a reducing agent into an exhaust gas path 2 is preferably disposed between the honeycomb filter 11 and the SCR catalytic converter 5. The reducing agent may be ammonia water, liquid ammonia or an aqueous urea solution.

[5] Ammonia Slip Means

With an ammonia slip means 8 disposed downstream of the SCR catalytic converter 5, the remaining ammonia, etc. not contributing to the conversion of NOx to $N_2$ can be removed in the SCR catalytic converter 5. A known ammonia slip catalyst may be used.

[6] Second Embodiment

Figure 7:
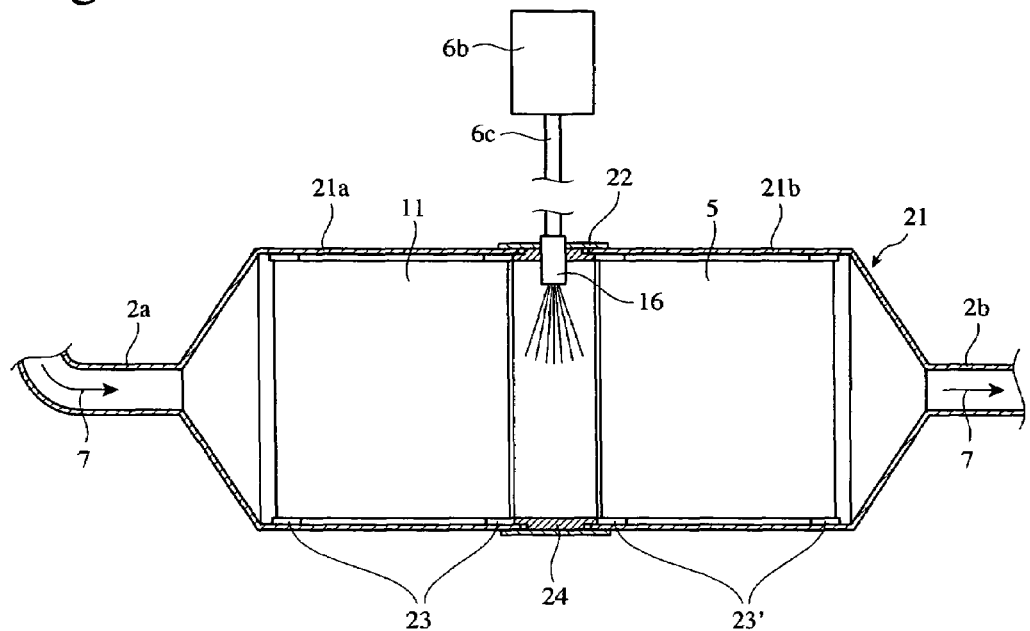
FIG. 7 is a cross-sectional view showing a porous ceramic honeycomb filter and an SCR catalytic converter contained in one case.

In the second embodiment shown in FIG. 7, a honeycomb filter 11 and an SCR catalytic converter 5 are contained in one case 21. The case 21 has an upstream-side opening connected to an exhaust gas path 2a communicating with a diesel engine, and a downstream-side opening connected to an exhaust gas path 2b communicating with an ammonia slip means 8. The case 21 is constituted by two portions 21a, 21b, both case portions 21a, 21b being gas-tightly connected via an annular member 22 by welding, etc. The annular member 22 is connected to a pipe 6c communicating with a reducing agent reservoir 6b, and a tip end of the pipe 6c is connected to a nozzle 16 substantially perpendicular to the longitudinal direction of the case 21.

Figure 8:
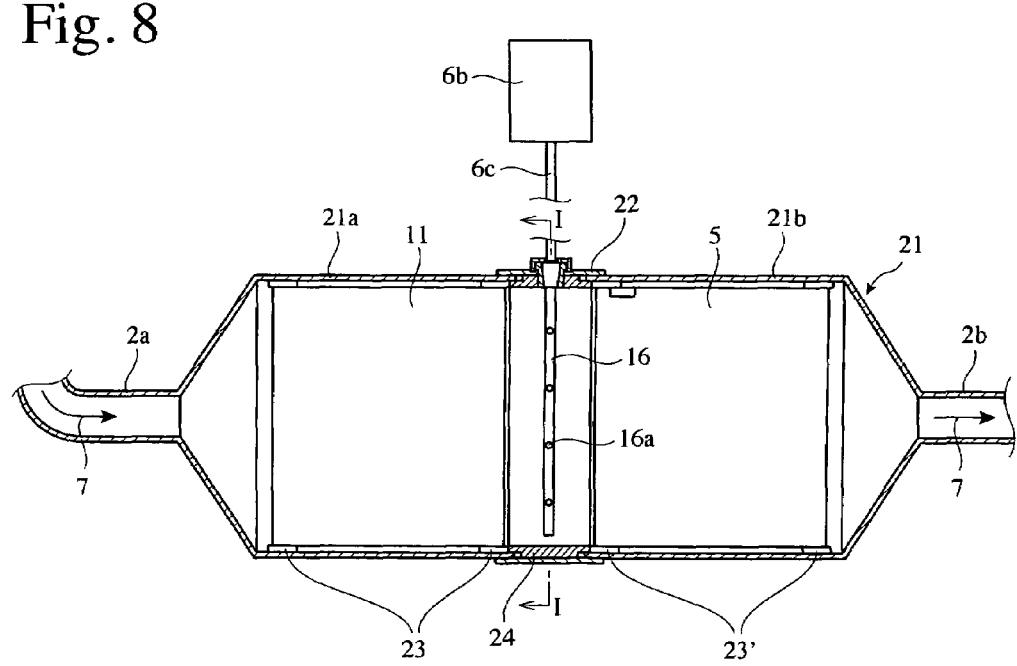
FIG. 8 is a cross-sectional view showing a nozzle disposed in one case between a porous ceramic honeycomb filter and an SCR catalytic converter.
Figure 9A:
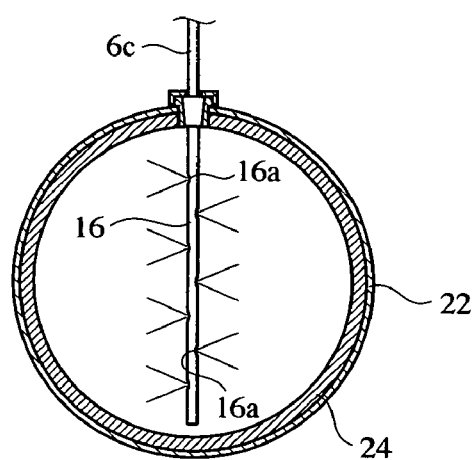
FIG. 9(a) is a cross-sectional view taken along the line I-I in FIG. 8.
Figure 9B:
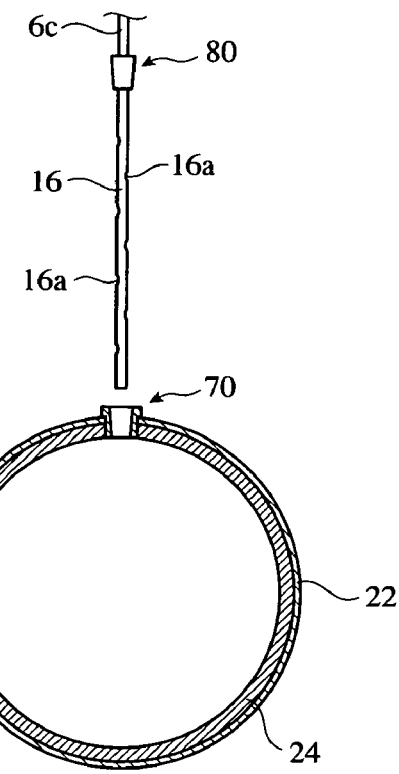
FIG. 9(b) is a cross-sectional view showing a state where the nozzle is detached from an annular member.

In the example shown in FIG. 8, the nozzle 16 is a linear nozzle fixed to the annular member 22, which has pluralities of openings 16a directed substantially perpendicularly to the longitudinal direction of the case 21. Because the reducing agent is ejected through the openings 16a substantially perpendicularly to the flow direction of the exhaust gas stream 7 as shown in FIG. 9(a), the reducing agent is uniformly mixed with the exhaust gas stream 7. Incidentally, the directions of the openings 16a are not restricted to 90° to the longitudinal direction of the case 21, as long as the reducing agent is uniformly mixed with the exhaust gas stream 7. As shown in 9(b), the nozzle 16 is detachable from the case 21.

The honeycomb filter 11 and the SCR catalytic converter 5 are fixed to the holders 23, 23', respectively. The holders 23, 23' may or may not be fixed to the case 21. When the annular member 22 is fixed to both case portions 21a, 21b by welding, etc., the spacer 24 is positioned stationarily between the holders 23, 23', so that the honeycomb filter 11, the nozzle 16 and the SCR catalytic converter 5 are fixed in the case 21. The holders 23, 23' may have any shapes, as long as the honeycomb filter 11, the SCR catalytic converter 5 and the nozzle 16 are fully fixed.

Because the honeycomb filter 11 and the SCR catalytic converter 5 are contained in one case 21, the following advantages are obtained.

(a) The exhaust gas discharged from the honeycomb filter 11 is introduced into the SCR catalytic converter 5 without being cooled.

(b) The heat of the honeycomb filter 11 is directly transmitted to the SCR catalytic converter 5 via the case 21.

(c) Because PM is accumulated on both upstream and downstream sides of the honeycomb filter 11, the exhaust gas discharged from the honeycomb filter 11 is not subjected to abnormally high temperatures. As a result, despite that the SCR catalytic converter 5 is contained in the same case 21 with the honeycomb filter 11, the SCR catalyst is not deteriorated by overheat.

The present invention will be explained in more detail referring to Examples below without intention of restricting the present invention thereto.

EXAMPLE 1

A honeycomb filter 11 for use in an exhaust gas-cleaning apparatus for a diesel engine was produced by the method shown in FIG. 3. Cordierite-forming material powder containing kaolin, talc, silica, aluminum hydroxide and alumina was mixed with a molding aid, a pore-forming agent and a predetermined amount of water, and then fully blended to prepare a ceramic material extrusion-moldable to a honeycomb structure. This ceramic material with moldable consistency was extrusion-molded to a honeycomb structure having large numbers of rectangular-cross-sectioned flow paths partitioned by porous cell walls inside a peripheral wall. The resultant green body was dried and fired to produce a ceramic honeycomb structure 10 having a diameter D of 267 mm and a length L of 305 mm, with porous cell walls 30 having thickness of 0.3 mm, a pitch of 1.50 mm, porosity of 65% and an average pore diameter of 20 µm.

Figure 3A:
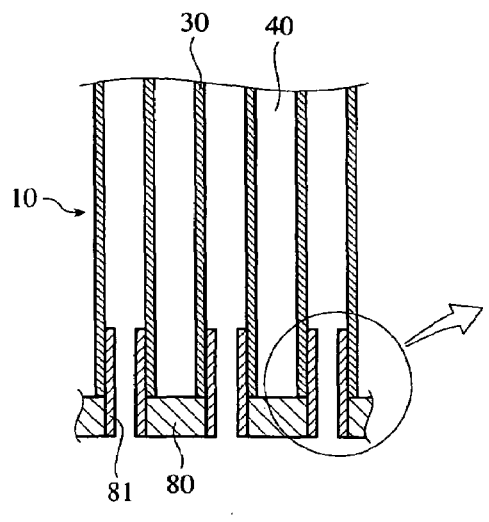
FIG. 3(a) is a schematic cross-sectional view showing the formation of plugs in portions of flow paths inside the end surface by introducing a plug-forming material into a honeycomb structure constituting the porous ceramic honeycomb filter.
Figure 3B:
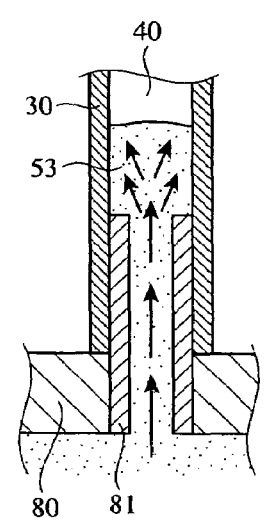
FIG. 3(b) is a partial, enlarged cross-sectional view showing a plug-forming material attached to and held by porous cell walls in each flow path.
Figure 3C:
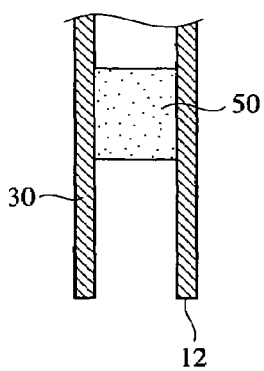
FIG. 3(c) is a partial, enlarged cross-sectional view showing a plug inside the end surface, which is formed by detaching a mask from the plug-forming material held by the porous cell walls.
Figure 4:
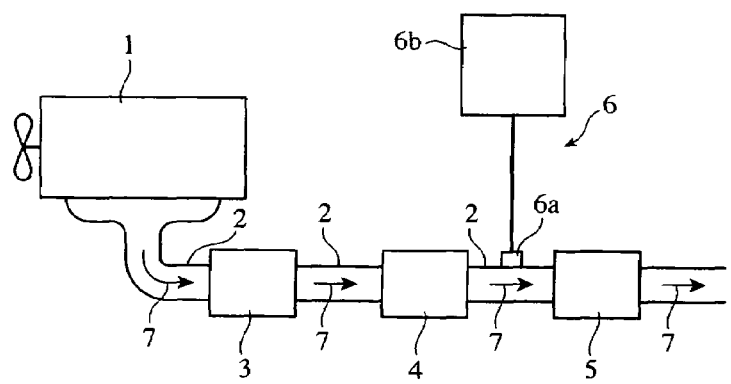
FIG. 4 is a schematic view showing a conventional exhaust gas-cleaning apparatus disposed in an exhaust system of a diesel engine.

As shown in FIG. 3(a), a resin mask 80 provided with slurry-introducing paths 81 in a checkerboard pattern was attached to an exhaust gas inlet end of the ceramic honeycomb structure 10. A slurry of a plug-forming material 53 was introduced into part of the flow paths 40 of the honeycomb structure 11 through the slurry-introducing paths 81 [FIG. 3(b)]. After the plug-forming material 53 was held in the porous cell walls 30, the resin mask 80 was removed, and the plug-forming material was dried. Plugs 50 were thus formed inside an end surface 12 as shown in FIG. 3(c). Plugs 52 at an exhaust gas outlet end of the honeycomb structure 10 were formed by attaching a masking film to an end surface by an adhesive, perforating the masking film in a checkerboard pattern, introducing a plug-forming material slurry from the end surface, and drying the plug-forming material. After forming both plugs 50, 52, the plug-forming material 53 was fired in a batch furnace with controlled temperature to obtain a honeycomb filter 11 having the structure shown in FIG. 2. The distance X between an exhaust gas inlet end 51 of the exhaust gas inlet-side plugs 50 and the end surface 12 of the honeycomb filter was 100 mm.

Figure 1:
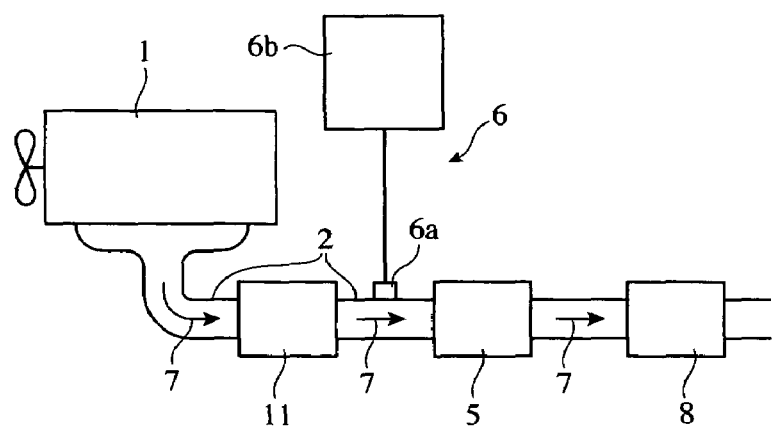
FIG. 1 is a schematic view showing the exhaust gas-cleaning apparatus according to the first embodiment of the present invention, which is disposed in an exhaust system of a diesel engine.

A catalyst comprising platinum (Pt), cerium oxide and active alumina was applied to the porous cell walls and the plugs of the resultant honeycomb filter 11. The amount of Pt supported was 2 g/L (2 g per 1 L of the honeycomb filter). This honeycomb filter 11 was disposed in an exhaust gas path 2 of a diesel engine 1 as shown in FIG. 1, and a means 6 for injecting ammonia as a reducing agent into the exhaust gas path 2, an SCR catalytic converter 5, and an ammonia slip means 8 were disposed downstream of the honeycomb filter 11. The SCR catalytic converter 5 comprised $V_2O_5$, $WO_3$ and $TiO_2$ supported by a cordierite honeycomb structure having a diameter D of 267 mm and a length L of 200 mm, with porous cell walls having thickness of 0.11 mm, a pitch of 1.06 mm, porosity of 30% and an average pore diameter of 5 µm. The reducing agent-supplying means 6 comprised a valve 6a for injecting ammonia stored in a reservoir 6b into the exhaust gas path 2.

An exhaust gas at 200° C. was caused to flow through the honeycomb filter 11 in the above exhaust gas-cleaning apparatus for 2 hours, so that PM was accumulated in the honeycomb filter 11. An exhaust gas at 350° C. and an unburned fuel were then supplied to the honeycomb filter 11, and after 5 minutes from starting the burning of PM, the temperature of the exhaust gas was lowered to 100° C., and the supply of the unburned fuel was stopped. Measurement after 2 minutes revealed that the exhaust gas discharged from the honeycomb filter 11 was as high as 320° C. This confirms that despite rapid decrease in the temperature of the exhaust gas flowing into the honeycomb filter 11, an exhaust gas discharged from the honeycomb filter 11 was kept at a high temperature. The SCR catalytic converter 5 was also kept at a high temperature, so that the conversion ratio of NOx to $N_2$ was substantially 100%. The remaining ammonia not contributing to the conversion of NOx to $N_2$ was removed by the ammonia slip means 8 disposed downstream of the SCR catalytic converter 5.

COMPARATIVE EXAMPLE 1

Plugs for sealing one end of each flow path of the same ceramic honeycomb structure 10 as in Example 1 were formed in a checkerboard pattern as shown in FIG. 5 by a known method. The plugs were fired in the same manner as in Example 1, and a catalyst containing 2 g/L of Pt was supported by the porous cell walls 30 of the honeycomb structure 10. The resultant honeycomb filter 11 was disposed in an exhaust gas path 2 of a diesel engine together with a reducing agent-supplying apparatus 6, an SCR catalytic converter 5 and an ammonia slip means 8 in the same manner as in Example 1.

An exhaust gas at 200° C. was caused to flow through this exhaust gas-cleaning apparatus for 2 hours, so that PM was accumulated in the honeycomb filter 11. An exhaust gas at 350° C. and an unburned fuel were then supplied to the honeycomb filter 11, and after 5 minutes from starting the burning of PM, the temperature of the exhaust gas was lowered to 100° C., and the supply of the unburned fuel was stopped. Measurement after 2 minutes revealed that the exhaust gas discharged from the honeycomb filter 11 was as low as 180° C. The temperature of the SCR catalytic converter 5 was thus lowered, so that the conversion ratio of NOx to $N_2$ was reduced to about 25%.

EXAMPLES 2 and 3

Using the same honeycomb filter 11 as in Example 1 except that the distance X was changed to 40 mm (Example 2) and 30 mm (Example 3), respectively, the exhaust gas-cleaning apparatus shown in FIG. 1 was produced. The displacement V (liter) of the diesel engine, the diameter D (mm) of the honeycomb filter, D/V, and the distance X are shown in Table 1.

An exhaust gas at 200° C. was caused to flow through the honeycomb filter in each an exhaust gas-cleaning apparatus for 2 hours, so that PM was accumulated in the honeycomb filter 11. An exhaust gas at 350° C. and an unburned fuel were then supplied to the honeycomb filter 11, and after 5 minutes from starting the burning of PM, the temperature of the exhaust gas was lowered to 100° C., and the supply of the unburned fuel was stopped. After 2 minutes passed, the temperature of the exhaust gas discharged from the honeycomb filter 11, and the conversion ratio of NOx to $N_2$ in the SCR catalytic converter 5 were measured. The results are shown in Table 1.

EXAMPLE 4

The temperature of the exhaust gas discharged from the honeycomb filter 11 and the conversion ratio of NOx to $N_2$ in the SCR catalytic converter 5 were measured in the same manner as in Example 2, except that a diesel engine having a displacement of 4.7 liters was used, and that the diameter D of the honeycomb filter 11 was reduced to 195 mm. The results are shown in Table 1.

EXAMPLE 5

The temperature of the exhaust gas discharged from the honeycomb filter 11 and the conversion ratio of NOx to $N_2$ in the SCR catalytic converter 5 were measured in the same manner as in Example 2, except that the diameter D of the honeycomb filter 11 was reduced to 195 mm. The results are shown in Table 1.

EXAMPLE 6

The temperature of the exhaust gas discharged from the honeycomb filter 11 and the conversion ratio of NOx to $N_2$ in the SCR catalytic converter 5 were measured in the same manner as in Example 2, except that the diameter D of the honeycomb filter 11 was further reduced to 130 mm. The results are shown in Table 1.

TABLE 1

| No. | Displacement V (liter) | Diameter D of Honeycomb Filter (mm) | D/V | Distance X (mm) | Exhaust Gas Temperature[1] (° C.) | Conversion Ratio of NOx to $N_2$ (%) |
|---|---|---|---|---|---|---|
| Example 2 | 13.0 | 267 | 20.5 | 40 | 310 | 100 |
| Example 3 | 13.0 | 267 | 20.5 | 30 | 300 | 100 |
| Example 4 | 4.7 | 195 | 41.5 | 40 | 310 | 100 |
| Example 5 | 13.0 | 195 | 15.0 | 40 | 250 | 80 |
| Example 6 | 13.0 | 130 | 10.0 | 40 | 220 | 75 |
| Com. Ex. 1 | 13.0 | 267 | 20.5 | 0.0 | 180 | 25 |

Note:
[1]The temperature of an exhaust gas measured at the outlet of the honeycomb filter 11.

As is clear from Table 1, in Examples 2-6, the conversion ratio of NOx to $N_2$ in the SCR catalytic converter was kept high even though the temperature of an exhaust gas discharged from a diesel engine lowered. Particularly in Examples 2-5, in which a ratio (D/V) of the diameter D of the honeycomb filter to the displacement V of the diesel engine was 15 or more, a low-temperature exhaust gas was prevented from flowing in the flow paths of the honeycomb filter at a high speed during the burning of PM, so that PM was kept burning, thereby keeping the exhaust gas discharged from the honeycomb filter at a high temperature, and thus keeping the conversion ratio of NOx to $N_2$ high in the SCR catalytic converter.

EFFECT OF THE INVENTION

In the exhaust gas-cleaning apparatus of the present invention comprising a honeycomb filter having exhaust gas inlet-side plugs inside the inlet end, an exhaust gas discharged from the honeycomb filter can be kept at a high temperature even when the temperature of an exhaust gas discharged from a diesel engine lowers, thereby preventing the conversion ratio of NOx to $N_2$ from decreasing in the SCR catalytic converter.

What is claimed is:

1. An apparatus for cleaning an exhaust gas containing nitrogen oxide and particulate matter and discharged from a diesel engine, wherein said apparatus comprises a porous ceramic honeycomb filter and an SCR catalytic converter in this order from upstream, wherein said honeycomb filter has pluralities of flow paths partitioned by porous cell walls and a catalyst supported by said porous cell walls, with desired flow paths sealed by plugs, and wherein at least one plug on the side of an exhaust gas inlet is separate inward from an exhaust gas inlet end,
wherein a ratio D/V of the diameter D (mm) of said honeycomb filter to the displacement V (liter) of said diesel engine is 15 mm/liter or more; said porous cell walls of said honeycomb filter have a thickness of 0.1-0.5 mm, a pitch of 1.2 mm or more, a porosity of 50-80% and an average pore diameter of 10-40 µm; and porous cell walls of a ceramic honeycomb structure for said SCR catalytic converter have a thickness of 0.05-0.25 mm, a pitch of 0.8-1.06 mm, a porosity of 25-45% and an average pore diameter of 1-10 µm.

2. The exhaust gas-cleaning apparatus according to claim 1, further comprising an ammonia slip catalyst downstream of said SCR catalytic converter.

3. The exhaust gas-cleaning apparatus according to claim 1, wherein a catalyst supported by said honeycomb filter comprises a platinum-group metal.

4. The exhaust gas-cleaning apparatus according to claim 1, wherein a catalyst supported by porous cell walls on the exhaust gas inlet side of said honeycomb filter is higher in activity than a catalyst supported by porous cell walls on the exhaust gas outlet side.

5. The exhaust gas-cleaning apparatus according to claim 1, wherein said honeycomb filter and said SCR catalytic converter are contained in one case.

6. The exhaust gas-cleaning apparatus according to claim 5, wherein a nozzle for injecting a reducing agent is disposed in said case between said honeycomb filter and said SCR catalytic converter.

7. The exhaust gas-cleaning apparatus according to claim 1, wherein the distance X between an inlet end surface of inlet-side plugs and the inlet end is 40 mm or more.

8. The exhaust gas-cleaning apparatus according to claim 1, wherein the distance X between an inlet end surface of inlet-side plugs and the inlet end is 0.5 times or less of the length of said honeycomb filter.

9. The exhaust gas-cleaning apparatus according to claim 1, wherein at least 70% of inlet-side plugs are positioned inside the inlet end by the distance X of 40 mm or more, said distance X being a distance between an inlet end surface of inlet-side plugs and the inlet end.

* * * * *